UNITED STATES PATENT OFFICE.

JOHAN CONRAD BERNTROP AND MARIUS LODEWYK QUIRYN VAN LEDDEN HULSEBOSCH, OF AMSTERDAM, NETHERLANDS.

PROCESS OF MANUFACTURING A SOLID COMBUSTIBLE FROM PETROLEUM, SULFURIC ACID, AND LIME.

SPECIFICATION forming part of Letters Patent No. 711,380, dated October 14, 1902.

Application filed June 12, 1902. Serial No. 111,323. (No specimens.)

*To all whom it may concern:*

Be it known that we, JOHAN CONRAD BERNTROP and MARIUS LODEWYK QUIRYN VAN LEDDEN HULSEBOSCH, subjects of the Queen of the Netherlands, and residents of Amsterdam, Netherlands, have invented certain new and useful Improvements in Processes of Manufacture of a Solid Combustible from Petroleum, Sulfuric Acid, and Lime; and we do hereby declare the following to be a full, clear, and exact description of the invention, such as will enable others skilled in the art to which it appertains to make and use the same.

The herein-described invention is in relation to a process for making, with the aid of petroleum, briquets which are valuable as combustibles.

Many experiments have already been made to bind petroleum in solid form and to employ as fuel the thus-obtained substance. For this purpose it has been proposed to use therewith rosin and lime, thus obtaining a semifluid material which may be absorbed by a suitable solid material that will prevent its flowing about; but such masses, even when made into briquets, are not available as fuel on war-ships and in many other places, because they do not stand being stored in a warm place, and in any case such material cannot be stored for a long time, especially if the temperature is at all high, because the petroleum runs therefrom. Our extended experiments, however, with briquets made with petroleum, lime, and rosin have gone to show that if the rosin be treated with sulfuric acid before it is mixed with the lime the briquets thereby made are firm and durable. They have a high resistance to pressure and heat and are admirably suited for solid fuel. Naturally such briquets, although they do not run through the grate, soften and melt under the high temperature of a furnace-fire and are then in every respect an advantageous fuel. They have the special advantage that they meet the requirement, especially stringent on a vessel of war, of promptly developing a high degree of heat, and thus permitting both rapid and controllable steaming. Their rapidity of melting may be controlled by firing them in connection with other and less-fusible fuel.

Among the various proportions of materials and manners of manufacture may be mentioned the following: Six hundred parts, by weight, of crude petroleum are warmed and one hundred parts of rosin dissolved therein. There are then added twenty parts of strong sulfuric acid—say of 60° to 65°—and the whole heated to the boiling-point. This causes foaming and blackening of the mixture. The resulting material is then mixed with one hundred parts of slaked lime, that may contain besides the water of combination about thirty-five per cent. of hygroscopic water, and the whole is vigorously stirred. In a short time the mass solidifies and may be pressed into briquets. Where desirable, brown coke or coal may be added before the forming into briquets. There may be also added to the mass before pressing, in case the fuel is to be used for metallurgical purposes, pulverized ore or minerals suitable to the process in which the fuel is to be employed. Such briquets may be made in the following manner: In three hundred parts, by weight, of crude petroleum there are dissolved after warming forty-five parts of rosin and then ten to twelve parts of strong sulfuric acid. The mixture is next warmed until it foams and blackens. To the plastic mass there are added fifty to sixty parts of slaked lime that contains in addition to the water of combination thirty-five per cent. of hygroscopic water, and the whole is then well stirred. The thus-obtained stiff and sticky mass is then mixed in a warm state with fine peat or brown coal and molded into briquets, preferably in a press. Such bricks can be burned in any stove or furnace. There can be added so much solid combustible to the plastic mass that it contains only fifty per cent. or less of petroleum. All the briquets obtained by these processes show a high resistance even to the action of water. The petroleum is so firmly combined therein that they may be used anywhere where other briquets may be employed as fuel. Naturally there must be given a sufficient quantity of air to permit good combustion. The smaller briquets can be used as kindling for coal or other fuel.

The above-described process differs from those in which there is employed a great quantity of unslaked lime or similar substance or substances in combination with petroleum and sulfuric acid principally with the object of forming sulfate of lime and not for the purpose of disintegrating the rosin, so that there is only a fuel with a high percentage of mineral and very little petroleum, in that there is therein employed a solution of rosin in an excess of petroleum and only enough sulfuric acid to decompose the rosin, and that there is added to the thus-obtained mass only enough slaked lime to produce a plastic material solid enough to absorb and retain a high percentage of petroleum.

What we claim as our invention, and desire to secure by Letters Patent, is—

1. A process for the manufacture of fuel from petroleum, which consists in dissolving rosin in petroleum, treating the solution with enough sulfuric acid to decompose the rosin, adding thereto slaked lime containing hygroscopic water while agitating the solution and briqueting the resulting product, substantially as described.

2. Fuel-briquets, consisting essentially of petroleum, of rosin that has been decomposed by sulfuric acid, and lime, substantially as described.

3. In the manufacture of fuel-briquets, the employment of rosin that has been decomposed by the action of sulfuric acid.

In testimony that we claim the foregoing as our invention we have signed our names in presence of two subscribing witnesses.

JOHAN CONRAD BERNTROP.
MARIUS LODEWYK QUIRYN
    VAN LEDDEN HULSEBOSCH.

Witnesses:
AUGUST SIEGFRIED DOCEN,
JOSEPH A. MUHLMAN.